May 29, 1956 R. DALLY 2,748,199

CHANNEL-SHAPED STYLUS

Filed Sept. 25, 1951

Inventor:
Roy Dally,
by Merton D Morse
His Attorney.

2,748,199
Patented May 29, 1956

2,748,199

CHANNEL-SHAPED STYLUS

Roy Dally, Liverpool, N. Y., assignor to General Electric Company, a corporation of New York Application September 25, 1951, Serial No. 248,113

10 Claims. (Cl. 179—100.41)

Figures 1, 2:
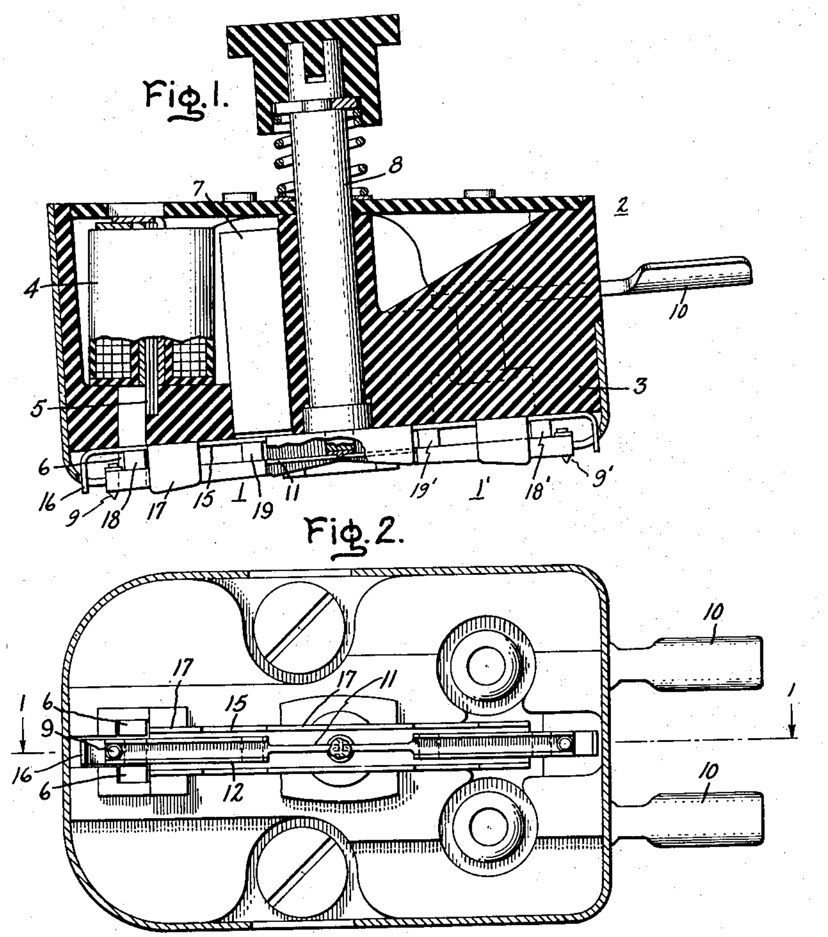

My invention relates to phonograph pickup apparatus which employs an elongated cantilever type of stylus support, and has particular reference to apparatus of the magnetic type having a variable reluctance pickup head.

Elongated stylus supporting members of substantial length have been employed in phonograph pickups as they enable the stylus to follow faithfully the lateral undulations of the record sound grooves. Such cantilever beam stylus supports have found useful application in magnetic variable reluctance pickup heads, the stylus support being made of magnetic material in order to furnish a low reluctance path for flux of the magnetic circuit of the pickup head. This general type of magnetic pickup is described in U. S. Letters Patent 2,511,663, issued June 13, 1950 to W. S. Bachman and assigned to the assignee of the present invention.

In present-day designs, a flexible stylus-carrying member is employed which is of rather small proportions to permit extremely faithful following of a record groove by the stylus for improved reproduction.

An object of my present invention is to produce a phonograph pickup of this general type having increased output.

A further object of my invention is to produce a stylus carrier member having a greater amount of magnetic material in the flux field in which it operates, thereby to produce greater flux variations in response to its vibrations and hence greater output from the pickup head.

A still further object of my invention is to attain these desired ends while at the same time producing high quality reproduction of recorded sound.

Briefly, in accordance with my invention, a stylus support for a variable reluctance pickup in the form of a straight, substantially-horizontal unitary beam of magnetic material is employed having two clearly-defined sections. One section, which provides all the beam flexure, has a very small cross-section area and has one end thereof fastened to the stylus beam support. The other section, which constitutes the flux-carrying portion of the beam, has a relatively-large cross-section area which may advantageously be of channel shape, and which has a stylus affixed to its free end. The mass of the beam is concentrated in the channel section, which moves as a whole with the stylus and provides the low-reluctance flux path desired for high output of the magnetic pickup head. Resonant vibration of the flexing section or of parts of it has little effect on the channel section because the mass of the former is relatively small. Resonant vibration of the channel section itself is inhibited by its stiffness due to its cross section.

In a specific embodiment, damping blocks between the channel section and the pickup head minimize vertical movement of the channel section, permitting further reduction in cross-section area of the flexing beam section. With such a stylus assembly, both lateral compliance and high output are obtained over a given range of audio frequencies with a minimum of distortion.

Figure 3:
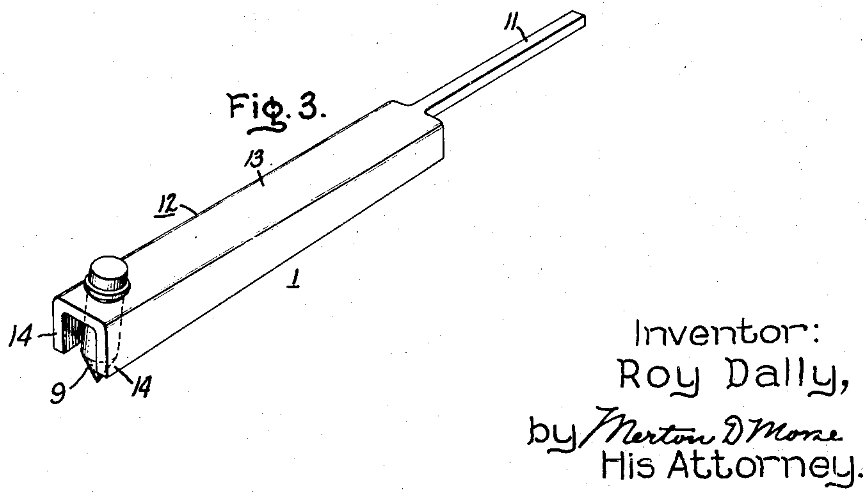

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a sectional side view of a phonograph pickup head of the magnetic type, taken generally along line 1—1 of Fig. 2 with a phonograph stylus support assembly incorporating my invention; Fig. 2 is a bottom view of the pickup head of Fig. 1; and Fig. 3 is a perspective view of the stylus and cantilever support beam employed in Figs. 1 and 2.

Referring now to Fig. 1 of the drawing, a phonograph stylus support is illustrated therein which is constructed in accordance with the principles of my invention and is indicated generally at 1. The stylus support 1 is shown in operative position, substantially-horizontally aligned and spaced from the lower surface of a phonograph pickup head of the reluctance type, which is indicated generally at 2. The phonograph pickup head is shown here as a variable reluctance type which employs a removable dual stylus assembly, the dual type of construction being disclosed and claimed in United States Letters Patent 2,554,209, issued May 22, 1951, to C. R. Miner and E. J. Zikmund and assigned to the assignee of the present invention. It is understood, of course, that the dual stylus assembly is described only as an illustration, and that my invention may be incorporated as well in single stylus assemblies. The electromagnetic voltage generator of pickups of this general nature is further described in Letters Patent 2,511,663, issued June 13, 1950 to William S. Bachman, and also assigned to the assignee of the present invention.

For a better appreciation of the function of the stylus support beam 1, the construction and operation of the pickup head 2 are herein briefly summarized. Accordingly, it may be seen that the pickup head comprises a body portion 3 which encloses the electro-magnetic current-producing portions of the pickup. Two series-connected coils 4, one of which is shown in Fig. 1, are supported within the body portion 3, each coil surrounding a leg of a magnetic core 5. A pair of pole pieces 6, each associated with a respective one of the coils 4, extend from the bottom or lower surface of the body portion 3. Magnetic flux which follows the magnetic path provided by the pole pieces 6 and the legs of the yoke 5 is supplied by a permanent magnet 7, preferably formed of a high energy magnetic material, such as an aluminum-nickel-cobalt alloy. The magnet is preferably of a bar type vertically disposed within the support member so that the magnetic flux from the upper and lower poles, respectively, of the magnet 7 has relatively short air paths to the upper portions of the magnetic yoke 5 and the stylus support beam 1, respectively.

The stylus support arm 1, which is particularly constructed as explained in following paragraphs, constitutes a cantilever support beam affixed at one end to a support post or shaft 8, and a stylus 9 is affixed, preferably by soldering, to the free end of the assembly arm. The support post 8 is preferably of a removable type which is axially inserted through an opening in the pickup head 2, with the arm or beam 1 extending radially from the end of the support post 8 past the lower pole of permanent magnet 7. The free end of the support arm to which the stylus is affixed is positioned between the pole pieces 6, thus providing a relatively-low reluctance path between the lower pole of magnet 7 and the pole pieces 6. A change in the lateral alignment of the end of the stylus support, that is, its spacing with respect to the respective pole pieces 6, thus changes the distribution of flux between the coils. Accordingly, lateral compliance of the stylus support arm with undulations in a sound groove of a phonograph record engaged by the stylus continuously varies the position of the portion of the support arm between the pole pieces and thus changes the flux balance through the coils 4 to generate a voltage in the coils. This voltage, whose variations represent variations in the recorded sound, is subsequently amplified and converted to sound waves by an audio amplifier (not shown) which is connected to the terminals 10 of the series-connected coils 4.

The particular stylus assembly illustrated in Figs. 1 and 2 is a dual stylus assembly whereby two support arms carrying different sizes of record-engaging styli can be selectively employed with records of different groove sizes. Thus, a second stylus support arm is shown in a non-operating position, the support post 8 being depressed and rotated in order to move the second stylus support arm 1′ into operating position. Since the stylus support assembly components associated with the second support arm 1′ are the same as those associated with the first support 1, they are indicated by corresponding numbers and need no prime marks (′) with further description herein.

Referring now to Fig. 3, a stylus support beam or arm 1, made in accordance with my invention, is illustrated. The stylus arm is preferably made from one strip of magnetic material, preferably sheet steel having a principal axis extending along the center line of its length. The sides of one portion 11 between the support post and a point near the lower pole of magnet 7 are cut away to leave a relative-low mass, small cross-section support along the principal axis. To minimize the lateral or horizontal stiffness, the width of the end portion 11 is not greater than the thickness of the sheet. The remaining length of the stylus arm, which provides a low reluctance flux path between the lower pole of magnet 7 and pole pieces 6, comprises a section 12 having a channel-shaped cross section. The web 13 of the channel section is uniform and relatively wide with respect to the narrow section 11 so as to be very stiff. Flanges, or channel sides, 14 on either side of the web 13, which are preferably formed by bending down edges of the sheet from which the beam is formed, are disposed opposite from each other and are preferably at 90 degrees to the web 13. These flanges help prevent flexing of beam section 14, and are suitably equal in width to the width of the web 13.

The channel beam portion 12 has a relatively-large moment of inertia with respect to both its horizontal and vertical cross-section axes, as compared to a beam of the same mass having rectangular or circular cross section. Accordingly, the channel section 12 is very stiff and has a resonant frequency beyond the operating range of vibrations to which the support arm is subjected due to compliance of the stylus with the sound groove undulations.

Thus it may be seen that the two sections 11 and 12 of the support beam are very different in structure and function. The flexing section 11 provides all of the compliance of the member 1, and may be regarded as a flexible projection extending from one end of the stiff channel section 13. The ratio of the mass of the channel section to that of the flexing section is relatively high, and is approximately 30:1 in the illustrated embodiment. The flexing section is preferably shorter than the channel section, which accounts for part of the high ratio, but the high ratio is chiefly due to the difference in cross-section areas of the two sections of the support beam. Thus, despite any tendency of the flexing section toward resonant vibration, the more massive channel section is relatively unaffected. At the same time, the channel section 12, due to its large cross section area, provides a large flux path without the mass needed for an arm of rectangular or circular cross section and comparable stiffness.

Undesirable effects of resonance of the flexing section 11 at audio frequencies are further minimized by the use of damping means.

Referring again to Figs. 1 and 2, a guide member 15 for the stylus support arm is shown. This member is made of a non-magnetic material such as brass or copper and is indexed into position on the under side of the pickup head body portion 3. The guide is fastened at one end to the support post 8 and extends radially therefrom spaced from and generally parallel to the beam 1. The other end of the guide has a portion 16 extending downwardly over the free end of the stylus support arm to help protect the stylus from accidental damage. The guide has further protective flange members 17 extending downwardly from either edge of the guide to partially enclose the stylus assembly. Since the stylus and end of the stylus arm yields when the pickup is dropped or when excessive pressure is applied to the pickup head, the guide then engages the record and thus shields the stylus.

Vibration damping blocks 18 and 19 are positioned between the web of the channel section 12 of the stylus support and the corresponding facing portion of the guide 13. While the damping blocks employed in the illustrated embodiment are rectangular blocks, it is to be understood that other forms of blocks, such as cylindrical sections, may suitably be employed. The blocks are made of rubber or other very resilient material and are preferably cemented to both the stylus support and the guide. Block 18 is located between the channel and the guide near the stylus or free end of the support beam 1. This block provides vertical damping and also resists torsional forces applied to the channel through the stylus as it attempts to follow the lateral undulations of the record groove. Damping block 19 is located between the channel web and guide at the other end of the channel section 12 adjoining the flexing section 11. This block provides vertical damping and also tends to prevent resonant vibrations in a lateral plane, thus preventing the intermediate portion of the beam from vibrating with the stylus 9 as a pivot. In addition, the damping blocks 18 and 19 help support the stylus support arm. This allows the cross section of section 11 of the stylus support to be further reduced for maximum lateral compliance. However, the flexible section 11, despite its light weight and flexibility, is strong enough in tension completely to prevent longitudinal displacement of the beam such as might tend to be caused by a pinch effect of opposing grooves on the stylus 9.

While the flanges 14 of the channel are of substantially uniform height along the length of channel section 12, it is desirable in some instances to taper the height of the flange slightly from a maximum dimension at the free end of channel section 12 to a minimum distance at the end near section 11. This taper is insufficient to affect the stiffness of the beam adversely under operating conditions, and may be provided to prevent contact of the edges of the channel flange with the phonograph records with which the device is used.

While the invention has been described by reference to a particular embodiment thereof, it will be understood that numerous modifications may be made by those skilled in the art without departing from the invention. I, therefore, intend by the accompanying claims to cover all such equivalent variations as come within the true spirit and scope of my invention.

What I claim as new and desired to secure by Letters Patent of the United States is:

1. A cantilever stylus arm adapted to vibrate between two magnetic poles and to carry magnetic flux thereto from a magnet spaced therefrom comprising a rigid, elongated, magnetic body portion of channel-shaped cross-section adapted to vibrate laterally between said pole pieces and extending from said pole pieces to said magnet whereby the flux path from said magnet to said pole pieces extends longitudinally through said body portion and a flexible supporting portion, having a dimension transverse to the longitudinal axis of said body portion less than the transverse dimension of said portion to provide for substantial compliance in a plane transverse to said longitudinal axis, extending axially from said body portion for attachment to a fixed support at a point sufficiently distant from said body portion and magnet to permit vibrations of said body portion in accord with undulation of a groove of a record to be reproduced due to flexure of said supporting portion.

2. A cantilever stylus arm adapted for use in a magnetic pick-up having a magnet and a pair of opposed magnetic pole pieces spaced therefrom, said stylus arm comprising a rigid, elongated, body portion of magnetic material having length extending from said magnet to said pole pieces and adapted to vibrate laterally between said pole pieces, and a flexible supporting portion, having a dimension transverse to the longitudinal axis of said body portion less than the transverse dimension of said body portion to provide for substantial compliance in a plane transverse to said longitudinal axis, extending axially from said body portion to a fixed support, said supporting portion having sufficient flexure between said magnet and said support to allow said body portion to vibrate bodily both parallel to, and at right angles to, the plane of the record to be reproduced.

3. A cantilever stylus support for a variable reluctance type of phonograph pickup comprising a channel-shaped, elongated, member of magnetic material adapted to carry a stylus at one end thereof and having a flexible projection, having a dimension transverse to the longitudinal axis of said channel-shaped member less than the transverse dimension of said channel-shaped member to provide for substantial compliance in a plane transverse to said longitudinal axis, extending axially at the other end for attachment to a pickup head, said channel member having side walls sufficiently extensive to increase materially the volume of magnetic material in the magnetic flux field in which said member operates, thereby to increase the flux variation produced by vibration of said member.

4. In a variable reluctance magnetic pickup head having oppositely-disposed pole pieces and a magnet spaced therefrom, the improvement comprising a stylus carrier comprising an elongated cantilever beam member supported at one end by said head and extending between said pole pieces at its other end, said carrier comprising a channel-shaped relatively-inflexible portion extending from said magnet to said pole pieces whereby a normal flux is transmitted longitudinally through said channel-shaped portion at said other end and a relatively-flexible portion, having a dimension transverse to the longitudinal axis of said member less than the transverse dimension of said member to provide for substantial compliance in a plane transverse to said longitudinal axis extending axially at the supported end, and a stylus secured to said other end.

5. In a magnetic pickup head having oppositely-disposed pole pieces, a stylus carrier comprising an elongated cantilever beam member adapted to be supported at one end on said head and adapted to extend between said pole pieces at its other end, said carrier comprising a channel-shaped relatively-inflexible portion at said other end and a flexible portion extending axially at the supported end, said flexible portion having a dimension transverse to the longitudinal axis of said channel-shaped portion less than the transverse dimension of said channel-shaped portion to provide for substantial compliance in a plane transverse to said longitudinal axis, the side walls of said channel-shaped portion being sufficiently extensive materially to increase the volume of magnetic material in the magnetic flux field in which said channel-shaped portion operates, thereby to increase the flux variation produced by vibration of said carrier, and a stylus secured to said other end for engaging a phonograph record groove.

6. A stylus assembly for a magnetic pickup head of the reluctance type having a pair of magnetic pole pieces spaced from each other and a third magnetic pole spaced from each of said pole pieces, which assembly comprises a unitary cantilever beam of magnetic material adapted to extend along a principal axis in a generally-horizontal plane between the lower surface of said pickup head and a phonograph record, a first section of said beam having one end supported on said lower surface and extending therefrom to a point near said third pole, a second section extending from said point to the free end of said beam between said pair of pole pieces, and a stylus affixed to said free end, said first section having a very small transverse cross-section area and mass relative to the cross-section area and mass of said second section.

7. A stylus assembly for a magnetic pickup head of the reluctance type having a pair of magnetic pole pieces spaced from each other and a third magnetic pole spaced from each of said pole pieces, which comprises a unitary cantilever beam of magnetic material adapted to extend along a principal axis in a generally-horizontal plane between the lower surface of said pickup head and a phonograph record, a first section of said beam having one end supported on said lower surface and extending therefrom to a point near said third pole, a second section having a channel-shaped cross section with a relatively-wide uniform horizontal web portion extending from said point to the free end of said beam between said pair of pole pieces to provide a magnetic flux path, and a stylus affixed to said free end, said first section having small cross-section dimensions relative to the width of the web portion of said second section, said first section providing substantially all the flexing of said beam.

8. A stylus assembly for a magnetic pickup head of the reluctance type having a pair of magnetic pole pieces spaced from each other and a third magnetic pole spaced from each of said pole pieces, which comprises a unitary cantilever beam of magnetic material adapted to extend along a principal axis in a generally-horizontal plane between the lower surface of said pickup head and a phonograph record, a flexible section of said beam having one end affixed to support means on said lower surface and extending therefrom to a point near said third pole, a rigid section of said beam having a channel-shaped cross section with a uniform horizontal web portion of greater width than that of said flexible portion extending from said point to the free end of said beam between said pair of pole pieces, said rigid section providing a path for magnetic flux between said pair of pole pieces and said third magnetic pole, and a stylus affixed to said free end, said flexible section having a small cross-section area and mass relative to the cross-section area and mass of said rigid section.

9. In a magnetic pickup head of the variable reluctance type having a pair of magnetic pole pieces spaced from each other and a third magnetic pole spaced from each of said pair of pole pieces, a stylus support assembly comprising a unitary cantilever beam of magnetic material having one end supported on said pickup head and a free end extending between said pair of pole pieces, said beam extending along a generally-horizontal principal axis with an intermediate portion thereof adjacent but spaced from said third magnetic pole, said beam having a channel-shaped cross section from said free end to said intermediate portion with a central web portion thereof in a substantially-horizontal plane and with flange members extending downwardly from either side of said web portion, and a stylus affixed to said free end extending downwardly in a general vertical direction in order to follow lateral undulations of the grooves of a phonograph record, said beam having from said intermediate portion to said supported end relatively-narrow cross-section dimensions compared with the width of said central web portion to provide substantially all the flexing of said beam for compliance with said lateral undulations.

10. A stylus support for a variable-reluctance type of phonograph pickup having a pair of spaced pole pieces, comprising a channel-shaped member of magnetic material adapted to carry a stylus at one end thereof to engage a record in a plane substantially parallel with said channel-shaped member, and a projection extending axially from the other end of said channel-shaped member for attachment to a pickup head, said projection being of less width and thickness than said channel-shaped member so as to be flexible in two directions at right angles to each other and of length sufficient to permit said channel-shaped member to vibrate bodily in two directions between said pole pieces.

References Cited in the file of this patent

UNITED STATES PATENTS

| | | |
|---|---|---|
| 1,728,278 | Miessner | Sept. 17, 1929 |
| 2,373,181 | Fleming | Apr. 10, 1945 |
| 2,388,116 | Bruderlin | Oct. 30, 1945 |
| 2,508,783 | Cornwell et al. | May 23, 1950 |
| 2,511,663 | Bachman | June 13, 1950 |
| 2,554,209 | Miner et al. | May 22, 1951 |